US008959502B2

(12) United States Patent
Ji et al.

(10) Patent No.: US 8,959,502 B2
(45) Date of Patent: Feb. 17, 2015

(54) PROCESSING TABLE OF CONTENT ACCESS OVERFLOW IN AN APPLICATION

(75) Inventors: Jin Song Ji, Shanghai (CN); Jian Jiang, Shanghai (CN); Si Yuan Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 317 days.

(21) Appl. No.: 13/525,756

(22) Filed: Jun. 18, 2012

(65) Prior Publication Data
US 2013/0031535 A1 Jan. 31, 2013

(30) Foreign Application Priority Data

Jul. 27, 2011 (CN) .......................... 2011 1 0219146

(51) Int. Cl.
*G06F 9/44* (2006.01)

(52) U.S. Cl.
USPC ........................................................ 717/162

(58) Field of Classification Search
USPC ......... 717/130–131, 140, 153, 159, 165, 162; 712/24, 213, 210; 711/170; 714/38.14; 719/332; 713/324
See application file for complete search history.

(56) References Cited

U.S. PATENT DOCUMENTS

| 4,791,558 A | * | 12/1988 | Chaitin et al. ................ 717/140 |
| 5,386,570 A | | 1/1995 | Lindhorst |
| 5,774,722 A | | 6/1998 | Gheith |
| 5,873,097 A | * | 2/1999 | Harris et al. .......................... 1/1 |
| 6,026,242 A | | 2/2000 | Chessin et al. |
| 6,219,830 B1 | * | 4/2001 | Eidt et al. ...................... 717/139 |
| 7,310,799 B2 | | 12/2007 | Eisenberg et al. |
| 2004/0225921 A1 | * | 11/2004 | Joshi .............................. 714/38 |
| 2008/0307403 A1 | * | 12/2008 | Heishi et al. .................. 717/153 |
| 2009/0193400 A1 | | 7/2009 | Baev et al. |

FOREIGN PATENT DOCUMENTS

| CN | 1776620 A | 5/2006 |
| CN | 1912828 A | 2/2007 |
| CN | 101276278 A | 10/2008 |
| JP | 10275088 | 10/1998 |

OTHER PUBLICATIONS

IECC, "Relocation", linker 07—Rev. 2.2—Jun. 30, 1999, pp. 1-11(herein IECC) <iecc_linker07.pdf>.*
Levine, John R. "Linkers & Loaders", published by Morgan-Kauffman in Oct. 1999, ISBN 1-55860-496-0 (pp. 1-299).
Office Action Dated Dec. 31, 2014, received in Chinese Patent Application No. CN201110219146.1, pp. 1-7.

* cited by examiner

*Primary Examiner* — Tuan A Vu
(74) *Attorney, Agent, or Firm* — Holland & Knight LLP; Brian J. Colandreo, Esq.; Jeffrey T. Placker, Esq.

(57) ABSTRACT

The present disclosure provides a method and system for processing table of content (TOC) access overflow in an application. The method may determine whether there occurs a TOC access overflow within an object file during linking the object file that may be generated from the compiling. If the TOC access overflow occurs within the object file, then the source file corresponding to the object file may be re-compiled so as to generate an object file having no TOC access overflow, and the object file may be re-linked to generate an executable file of the application. The present disclosure may adopt two-pass compiling and a dual-instruction TOC access in a form of two pieces of instructions that may be generated for TOC entries within which TOC overflows generally occur.

8 Claims, 5 Drawing Sheets

PROCESSING TABLE OF CONTENT ACCESS OVERFLOW IN AN APPLICATION

RELATED APPLICATIONS

This application claims the benefit of Chinese Patent Application Number 201110219146.1 filed on 27 Jul. 2011, the entire contents of which are herein incorporated by reference.

TECHNICAL FIELD

The present disclosure relates to processing table of content (TOC) access overflow in an application.

BACKGROUND

POWER systems for AIX and Linux are products in a computer (e.g., server) series, wherein tools chain usability and performance may be a basis on which the POWER system has been developed.

Regarding the POWER system, an issue known as "TOC overflow" may occur during construction of an application. The TOC overflow may limit usage of global data/codes, which is often very inconvenient to the developers of the POWER system

SUMMARY OF DISCLOSURE

According to one embodiment of the present disclosure, there is provided a method of processing an application, comprising: compiling a source file of the application to generate an object file that may correspond to the source file; linking the object file that may be generated from the compiling to determine whether there occurs a TOC access overflow within the object file; in response to occurrence of the TOC access overflow within the object file, re-compiling the source file corresponding to the object file within which the TOC access overflow may occur so as to generate an object file having no TOC access overflow; and replacing, with the object file having no TOC access overflow as generated from the re-compiling, the object file within which the TOC access overflow occurs, and re-linking the object file.

According to another embodiment of the present disclosure, there is provided a system of processing an application, comprising: a compiler configured to compile a source file of the application to generate an object file that may correspond to the source file; a linker configured to link the object file that may be generated from the compiling, wherein the linker is further configured to determine whether there occurs a TOC access overflow within the object file; the compiler is further configured to, in response to occurrence of the TOC access overflow within the object file, re-compile the source file corresponding to the object file within which the TOC access overflow occurs so as to generate an object file having no TOC access overflow; and the linker is further configured to replace, with the object file having no TOC access overflow as generated from the re-compiling, the object file within which the TOC access overflow occurs, and re-link the object file.

By adopting two-pass compiling, the present disclosure may generate a dual-instruction TOC access in a form of two pieces of instructions for TOC entries within which TOC overflows may occur.

BRIEF DESCRIPTION OF THE DRAWINGS

Features, advantages, and other aspects of various embodiments of the present disclosure will become more apparent through the following detailed description with reference to the following drawings, wherein.

DETAILED DESCRIPTION OF THE EMBODIMENTS

Aspects of the present disclosure are described below with reference to the methods and systems of the present disclosure. In the Figures, each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which are executed via the computer or other programmable data processing apparatus, create means configured to implement the functions/acts specified in the flowcharts and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus to cause a series of operational steps to be performed on the computer, other programmable apparatus to produce a computer implemented process such that the instructions that are executed on the computer or other programmable apparatus provide processes for implementing the functions/acts specified in the flowcharts and/or block diagram block or blocks.

Figure 1:
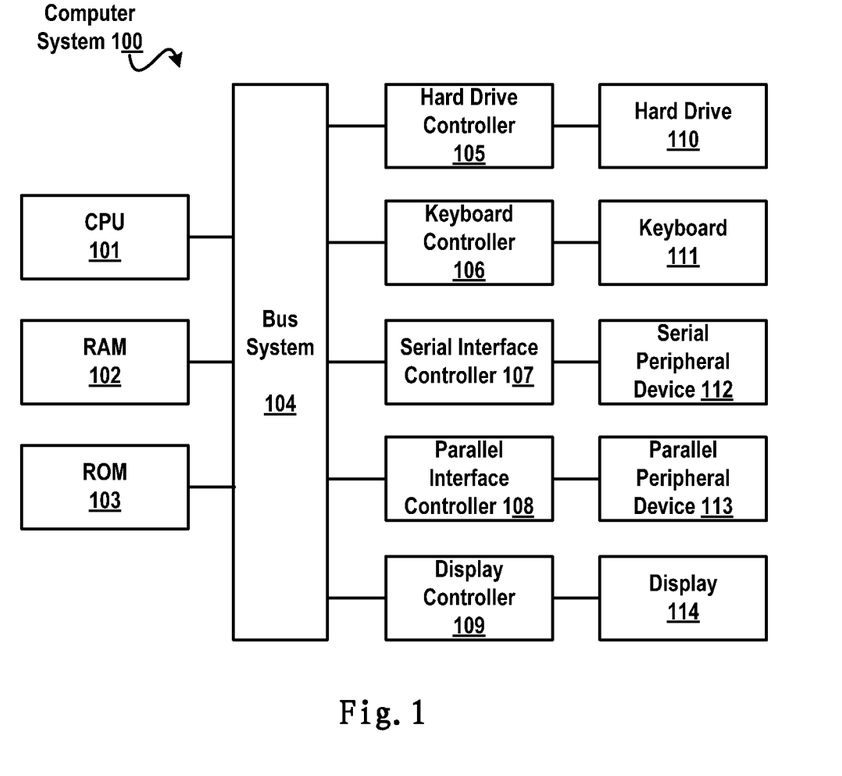
FIG. 1 illustrates a block diagram of an exemplary computer system 100 that is applicable to implement embodiments of the present disclosure.

FIG. 1 illustrates a block diagram of an exemplary computer system 100 that is applicable to implement the embodiments of the present disclosure. As illustrated in FIG. 1, the computer system 100 may comprise: CPU (Central Process Unit) 101, RAM (Random Access Memory) 102, ROM (Read Only Memory) 103, Bus System 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. Display 114 is coupled to Display Controller 109. It should be understood that the structure as illustrated in FIG. 1 is only for example purposes rather than any limitation to the present disclosure. In some cases, some devices may be added to or removed from the computer system 100 based on specific situations.

Terms related to the present disclosure will be described before the embodiments of the present disclosure are described in details with reference to the drawings.

Hardware Instructions of IBM POWER

Hardware of IBM POWER may support loading/storing offset instructions. For example, "L RT, offset (RA)" indicates that data are loaded into Register RT from the address "offset+RA." Here "offset" is immediate value between $-2^{16}$ and $2^{15}$.

TOC (Table of Content)

ABI (Application Binary Interface) of AIX and Linux with 64 bits define TOCs, which TOC may be actually a portion allocated in a memory. All of the addresses of global variables and function pointer may be placed in the TOC, thus they may be accessed via respective addresses.

TOC Access

Figure 2:
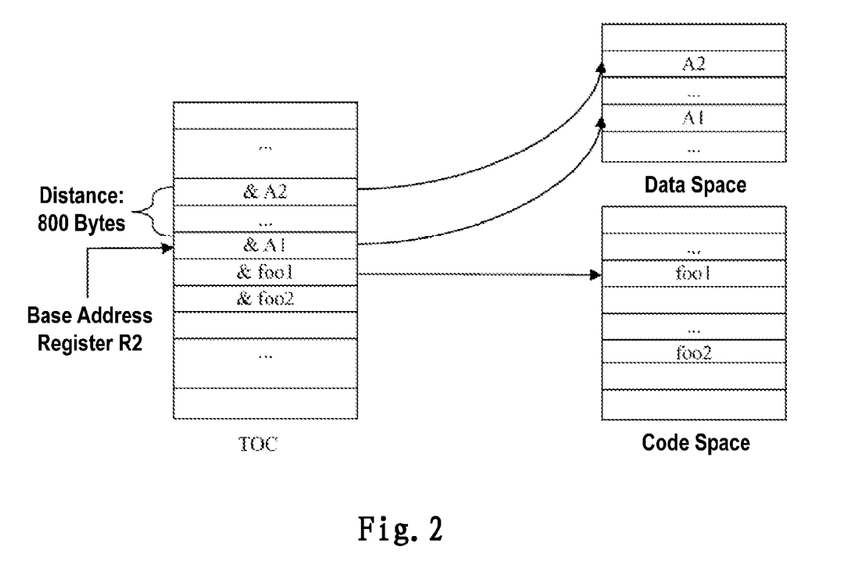
FIG. 2 illustrates a schematic diagram of a TOC access.

Generally, one piece of loading instruction is applied to implement TOC address access. The TOC stores addresses of data and functions. FIG. 2 illustrates a schematic diagram of TOC access. In FIG. 2, Base Register R2 points to the central position of the TOC. To access to the data, the addresses of the data may be first obtained via the TOC, and then the access to the data may be implemented based on the addresses. For example, when a global variable A2 is used, a compiler may first load the address of A2 by accessing TOC with "L R3, offset_of_A2(R2)." R2 may be the base address of the TOC, while "offset_of_A2(R2)" may be the offset of the TOC entry A2 in the TOC. It is appreciated that, the TOC entry may store the address of A2 instead of the value of A2.

Then, the compiler may obtain the value of A2 using another piece of loading instruction: "L R4, R3." It is appreciated that, Register R3 may obtain the address of A2 during the latest TOC access.

Taking TOC as illustrated in FIG. 2 as an example, if it is desired to access data "A2," first, the location of "A2" in the TOC may be calculated according to the offset location (+800) of "A2" in the TOC and the Base Register R2 (base address of the TOC); and then the address of "A2" may be read. This step may be implemented by a piece of instruction "LOAD R3, 800(R2)." After the run of this instruction, the address of "A2" may be stored in Register R3. Afterwards, the desired data may be obtained by accessing the data space in the memory again using the above address.

As illustrated in FIG. 2, TOC may store addresses of functions such as foo1 and foo2 in addition to being applicable to data such as A1 and A2. Similarly, if it is desired to call the function foo1, the location of "foo1" in the TOC may be calculated according to the offset location of "foo1" in the TOC and the Base Register R2; and then the address of "foo1" may be read. Afterwards, the function is called by accessing the code space in the memory with the above address.

Linker Relocation

The TOC is not necessarily created during the compiling and the compiler may not know the offset of the TOC entry. For example, "offset_of_A" is unknown in the above example and the compiler must generate a specific label in the instruction. The linker collects all information of the TOC during linking. The offset may be calculated out at this time. In the above example, "offset_of_A" is calculated and its value (such as 10000) is filed into the instruction. This procedure is called linker relocation.

TOC Overflow

TOC overflow may occur when trying to access a TOC entry with very large offset. The offset may be too large to be encoded into a single-instruction in a form of immediate value. For a system with 64 bits, its address is in 8 bytes, which means that one TOC entry (global data address) occupies 8 bytes. If the TOC comprises more than 8192 entries ($2^{16}/8=8192$), then not all of the TOC entries can be loaded by a legal single-instruction such as "L R3, offset_of_A(R2)" because some of the entries may be greater than $+2^{15}$ (or less than $-2^{15}$).

It is appreciated that, the compiler may not know the size of the TOC during compiling. Accordingly, if the compiler always generates a single-instruction such as "L R3, offset_of_A(R2)" to access the TOC, then the linker may not implement the relocation with regard to some of the instructions. This situation is referred to as TOC access.

Figure 3:
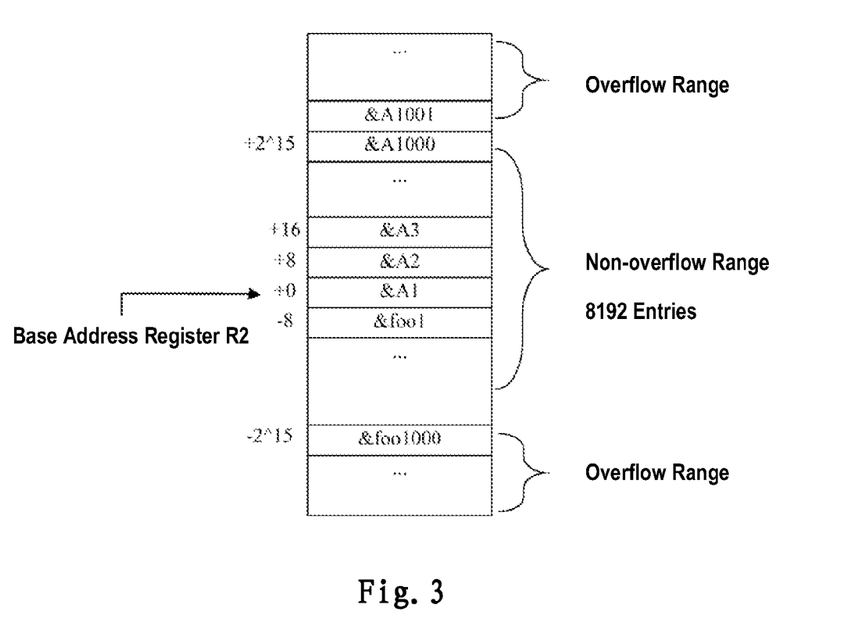
FIG. 3 illustrates a schematic diagram of a TOC overflow.

FIG. 3 illustrates a schematic diagram of a TOC overflow. In FIG. 3, address of data "A1001" is stored in a TOC entry with an offset of $+2^{15}+1$. The data may be located in TOC overflow range because, e.g., its address may not be obtained by one piece of LOAD instruction.

There have been some known solutions for solving the TOC overflow. For example, in one possible solution, the compiler always uses a dual-instruction TOC access.

In this situation, the compiler generates a dual-instruction TOC access for accessing TOC of large size, instead of merely using a single-instruction to access the TOC. This solution may use two pieces of instructions as below:

(1) CAU r3, r2, offset_up
(2) L r3, offset_lo(r3)

This is designed for an offset with 32 bits. The first instruction is added with an offset of a higher 16 bits and the second instruction is added with an offset of a lower 16 bits, and then they are loaded. By this means, it can be ensured that no TOC overflow occurs.

The defect of this solution is that, in this solution, the compiler must generate a dual-instruction TOC access for each TOC access because the compiler cannot calculate out the offset of the TOC entry. Accordingly, in the situation that no overflow occurs (the offset $<2^{15}$), the access to these TOC is not efficient enough.

Another solution is that the compiler generates one piece of loading instruction for the TOC access, i.e. a single-instruction TOC access. Upon occurrence of an overflow, the linker makes patches to these overflows. Specifically, when the linker has calculated out the offset of the TOC entry and found occurrence of a TOC overflow, the linker modifies codes as below:

```
L r3, offset(r2)
==>
B       tx                  //replacing "L r3, offset(r2)"
        returnx:            // the jump to and return to label
...
        tx:
CAU     r3,r2,offset_up     // a dual-instruction TOC access
L       r3,offset_lo(r3)
B       returnx
```

In this solution, why the linker cannot replace one-pass loading TOC access with dual-instruction TOC access is that, it is very difficult to modify the size of the codes. The linker must replace the original single-instruction TOC access with one piece of instruction ("B tx") to ensure that the size of the codes may not change. Then, a segment of codes are attached to the end of the codes (target of branch). Drawbacks of this solution is that such a patch needs two additional jumps ("B tx" and "B return") while these jumps may seriously degrade the runtime performance.

Another possible solution is that, if the size of TOC is too large, the TOC entries may be coalesced by IPA (Inter Procedure Analysis). IPA relates to an extremely burdensome optimization during the linking. IPA has all information of the entire procedure, including the TOC information. IPA will join the TOC entries so as to avoid overflows.

Drawbacks of this solution are that IPA is very time-consuming, and its application is restrained under many situations, particularly when the application is very large. However, TOC overflows are much likely to occur in this situation. As a result, most of business clients would rather not apply IPA only for solving the problems of TOC overflow.

Figure 4:
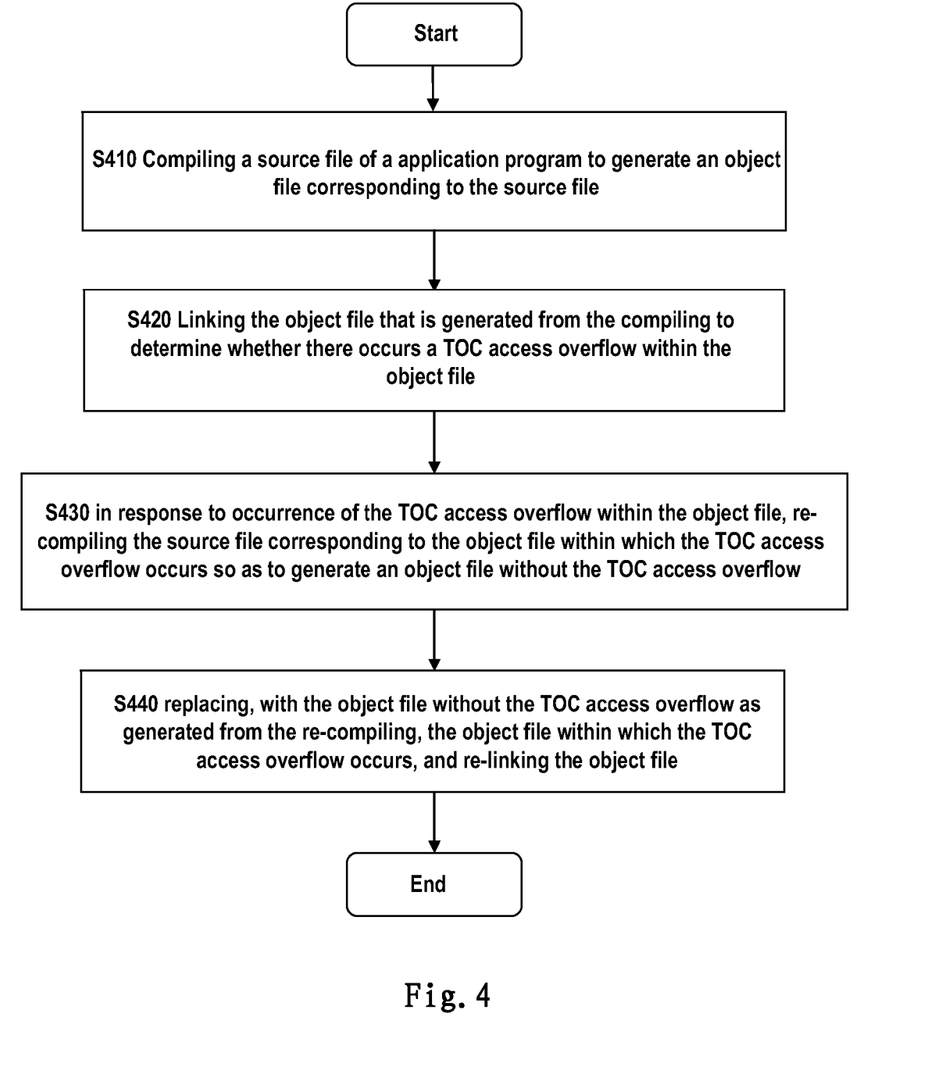
FIG. 4 illustrates a flowchart of a method of processing TOC overflow according to one embodiment of the present disclosure.

Hereinafter, a flowchart of a method of processing TOC overflow according to one embodiment will be described with reference to FIG. 4.

At S410, the compiler receives the source file of the application, compiles the source file of the application to generate an object file corresponding to the source file. The procedure of compiling may be implemented in common compiling ways in the art.

At S420, the linker receives the object file from the compiler, links the object file and determines whether there occurs a TOC access overflow within the object file during the linking procedure.

At S430, the compiler re-compiles the source file corresponding to the object file within which the TOC access overflow occurs if there occurs a TOC access overflow within the object file. For example, during the re-compiling procedure, because the compiler knows the object file within which the TOC overflow occurs, it may generate a TOC access having no TOC overflow for the source file corresponding to the object file during the re-compiling procedure. Because the re-compiling procedure may be performed only to the source file corresponding to the object file within which the TOC overflow occurs, it may be ensured that no unnecessary impact is cased on the performance if no TOC overflow occurs.

At S440, the object file within which the TOC access overflow occurs is replaced with the object file having no TOC access overflow as generated from the re-compiling, and then the object file is re-linked to generate an executable file of the application.

Figure 5:
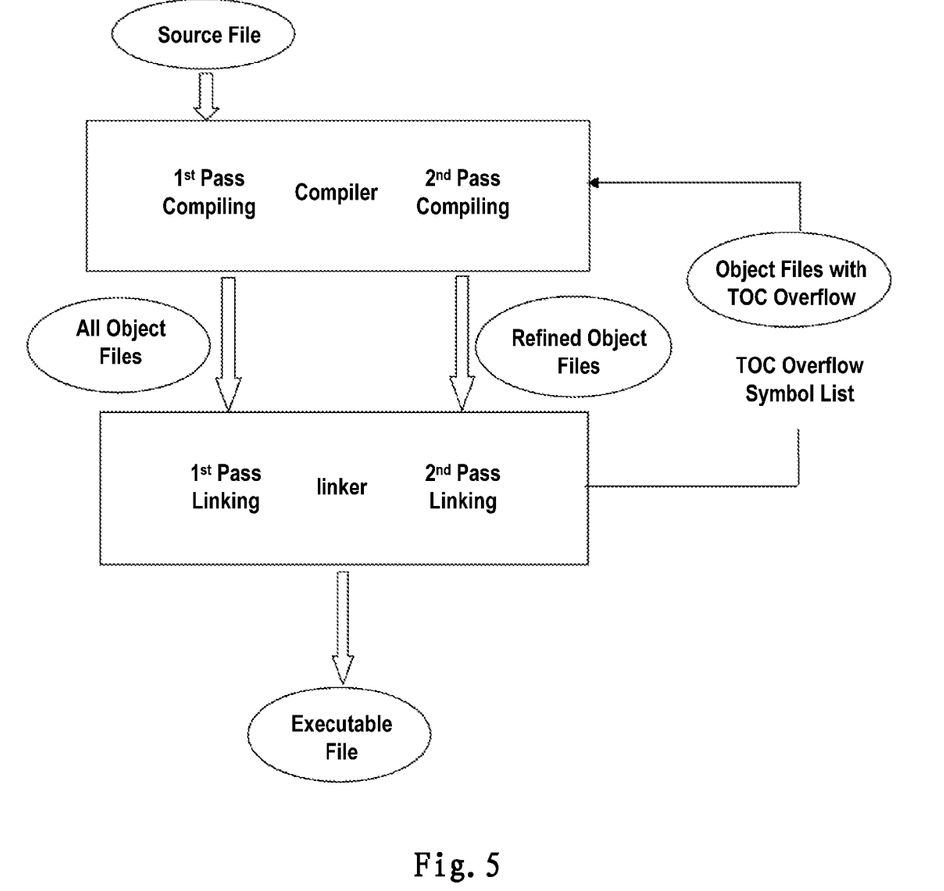
FIG. 5 illustrates a schematic diagram of a procedure of processing TOC overflow according to another embodiment of the present disclosure.

FIG. 5 illustrates a schematic diagram of a procedure of processing TOC overflow according to another embodiment of the present disclosure. First, the compiler may receive a source file of the application and may compile the source file so as to generate an object file corresponding to the source file. In this embodiment, such a compiling procedure is implemented with a common compiling method and then a TOC address access in a form of one piece of loading instruction may be generated. For example, in the environment of AIX and Linux, the compiler may be called by certain options such as "-qpic=smart" such that a common TOC access (one-pass loading) is generated. Furthermore, compiling commands and compiling environments may be recorded in the ".comment" portion of the object file, which is similar as the situation when an option "-qsaveopt" is adopted. This information may be used to call the second pass compiling as necessary.

Then, the linker checks whether there is any symbol in which the TOC overflow occurs within the object program. If no TOC overflow occurs, the entire construction procedure ends, and the linker outputs the executable file of the application. If there are symbols in which TOC overflows occur, the linker records in an overflow symbol list the overflow information, such as "/tmp/foo." The overflow information may be an overflow symbol/object filename. In other words, the information may be an overflow symbol of the TOC access overflow and an object filename of the object file containing the overflow symbol. The overflow symbol list may provide input to the subsequent second pass compiling.

For each object file having overflow symbols, the linker may extract a compiling command string from the ".comment" portion of the object file. The compiling command is saved in the ".comment" portion of the object file in a form of string.

Regarding each overflow object file, a final command for calling the compiler to perform the second pass compiling may be constructed by adding a command indicating the a file of the overflow symbol list to the compiling command as read from the object file.

When a certain option "-qtocsymf" (this command is used for specifying the file of overflow symbol list) is set, the compiler performs the second pass compiling step. In this embodiment, the compiler reads the file of TOC overflow symbol list as inputted and compiles the source file of the application. Wherein, a common TOC access (in a form of one pass loading) is performed to symbols that are absent from the overflow symbol list, and a dual-instruction TOC access (in a form of two pieces of instructions) may be performed to symbols that are presenting in the overflow symbol list.

It is appreciated that, although embodiments of the present disclosure are described by examples of duan-instruction TOC access, those skilled in the art may understand, the present disclosure is not limited in the two-piece-instruction form, and multi-instruction form having more than two pieces of instructions fall within the protection scope of the present disclosure as long as the TOC overflow may be removed.

Figure 6:
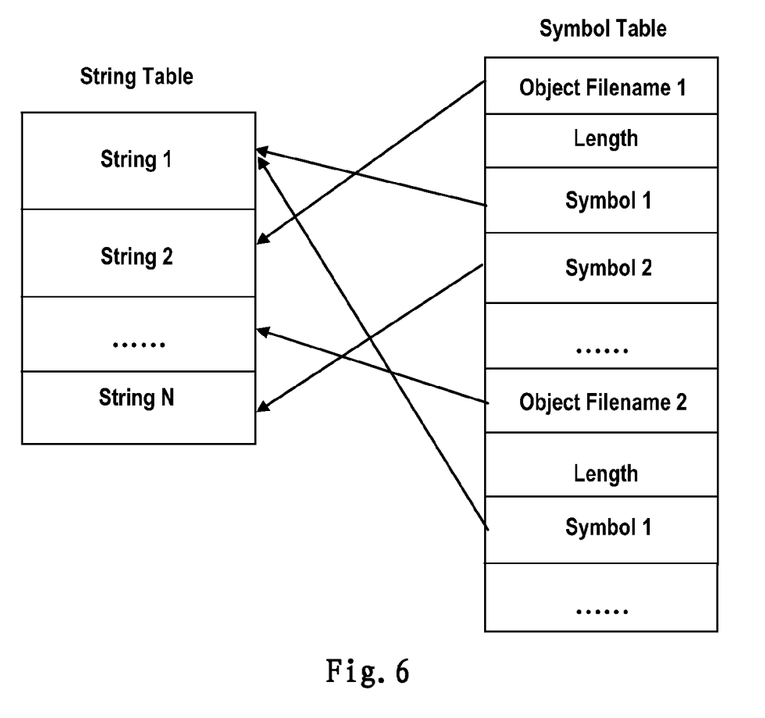
FIG. 6 illustrates a schematic diagram of a overflow symbol list.

FIG. 6 illustrates an example of the overflow symbol list. In FIG. 6, the file is formatted in a two-level storing method with string tables as illustrated in FIG. 6 in order to avoid a waste of list file space caused by repetitive appearance of symbols under different object filenames.

Then, a second pass linking is performed as illustrated in FIG. 5. During the second pass compiling, the object files within which the TOC overflow occurs as generated from the first pass compiling is replaced with a modified object file as generated from the second pass compiling. All the non-overflow object files are from the first pass compiling. The linker links all the object files such that an executable file of the application is generated. No TOC overflow occurs during this step.

Regarding applications of general sizes, TOC overflows may occur in little amount of TOC symbols or may never occur. Accordingly, it may be unnecessary for most of the object files to go through a second pass compiling/linking.

Compared to the common construction procedure, if necessary (when TOC overflow occurs in the first pass linking), the second pass compiling/linking may be called automatically and only files with TOC overflows may go through the second pass compiling.

The present disclosure adopts two-pass compiling and dual-instruction TOC access in the form of two pieces of instructions is generated only for TOC entries that really encounter TOC overflows. Accordingly, an express TOC access may be generated intelligently and any loss in performance may be avoided. Compared to the known solution, the express TOC access in the form of one piece of loading instruction may be generated when TOC overflow does not occur, such that the loss in performance, as resulted from generating dual instructions of TOC access at every time, may be avoided. Further, the loss in performance resulted from making patches by the linker may be avoided as well because the dual-instruction TOC access in the form of two pieces of instructions may be generated when TOC overflows occur.

For the entire construction procedure from the source file to the executable file, construction time added by the present disclosure is very short. For an application of general size, TOC overflows occur in only very little amount of TOC symbols or never occur. It means that the second pass compiling may not be needed for most of the object files.

With the present disclosure, a user may achieve optimal performance with the minimum construction time added. Furthermore, it does not require the user to test the TOC overflow and make reconstruction manually when he/she does not know the size of the TOC/application.

According to another embodiment of the present disclosure, there is provided a method of further improving performance by selecting/identifying TOC overflow symbols in the first pass linking. In this embodiment, a method of re-sorting the TOC entries will be implemented when the linker detects a TOC overflow.

The compiler provides frequency information of each TOC entry by accumulating the frequency of each access. The information may be obtained from a static/dynamic profiling analysis. The information is stored in the ".comment" portion of the object file.

The linker may re-sort the TOC entries according to the frequency information provided by the compiler when it detects that the TOC is too large and an overflow may occur, therefore, it is ensured that uncommon symbols (i.e., symbols with low frequency of occurrence) may be far away from hot symbols. This optimization ensures as far as possible that the hot TOC symbols may not overflow and minimum the overall loss of the overflows.

For example, for a loop, A1 access is out of the loop while A2 access is in the loop:
A1= . . .
Loop
A2= . . .
Information as generated by the compiler through the static profiling analysis is:
A1: 10
A2: 100

The linker may re-sort A1 and A2 to ensure that A2 is much closer than A1 in the TOC because the A2 access is not likely to cause an overflow. Of course, the overflow may occur when much hotter symbols occupy the entire TOC, but this situation rarely happens.

Occurrence of TOC overflow may be further reduced according to the above embodiments of the present disclosure. It is appreciated to those skilled in the art that, the above solutions may be applied separately to reduce the occurrence of TOC overflows, or they may be applied in combination with the solution of one of the embodiments according to the present disclosure as illustrated in FIG. 4 or 5 in order to reduce the impacts of TOC overflows on performance.

Figure 7:
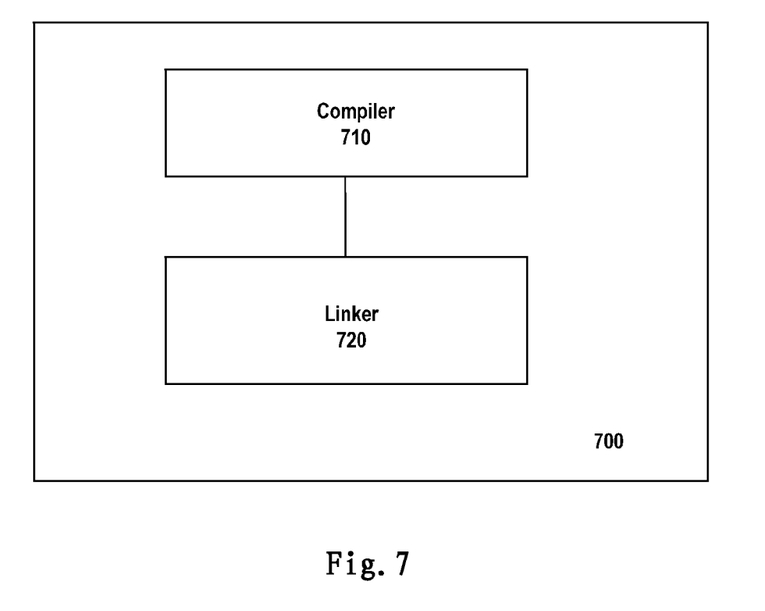
FIG. 7 illustrates a block diagram of a system of processing TOC overflow according to one embodiment of the present disclosure.

FIG. 7 illustrates a block diagram of system for processing TOC overflow according to one embodiment of the present disclosure. The system 700 comprises a compiler 710 and a linker 720. In the embodiment, the compiler 710 is configured to compile a source file of the application to generate an object file corresponding to the source file. The solution may be achieved with common compiling procedure to generate a single-instruction TOC access. Linker 720 is configured to link the object file that is generated from the compiling to determine whether there occurs a TOC access overflow within the object file. The compiler 710 is further configured to, in response to occurrence of TOC access overflow within the object file, re-compile the source file corresponding to the object file within which the TOC access overflow occurs so as to generate an object file having no TOC access overflow. The linker 720 replaces, with the object file having no TOC access overflow as generated from the re-compiling, the object file within which the TOC access overflow occurs, and re-links the object file.

According to one embodiment of the present disclosure, the compiler 710 is further configured to generate a multi-instruction TOC access for the source file corresponding to the object file within which the TOC access overflow occurs. In this embodiment, the multi-instruction TOC access may be a dual-instruction TOC access in a form of two pieces of instructions.

According to one embodiment of the present disclosure, the compiler 710 is further configured to record a compiling command of the compiling.

According to one embodiment of the present disclosure, the linker 720 is further configured to record in an overflow symbol list overflow information of the overflow, and the compiler 710 is further configured to determine the object file within which the TOC access overflow occurs according to the overflow symbol list.

According to one embodiment of the present disclosure, the overflow information comprises an overflow symbol of the TOC access overflow and an object filename of the object file containing the overflow symbol.

According to one embodiment of the present disclosure, the compiler 710 is further configured to obtain frequency information of the TOC symbol; and the linker 710 is further configured to re-sort TOC entries according to the frequency information of the TOC symbol. In this embodiment, the frequency information is obtained from a static/dynamic profiling analysis by accumulating frequency of each access. The linker may re-sort the TOC entries according to the frequency information provided by the compiler when it detects that the TOC is too large and an overflow may occur; therefore, it is ensured that the rare symbols (i.e., symbols with low frequency of occurrence) may be far away from the hot symbols. This optimization ensures as far as possible that the hot TOC overflows will not overflow and minimizes the overall loss of the overflows.

It is appreciated that, although the present disclosure is described with examples of POWER system, those skilled in the art may understand that, the present disclosure should not be limited to POWER system, instead, the present disclosure may be applied to any procedures for compiling and linking applications so as to reduce the effects of TOC overflows on performance.

The present disclosure further provides storage medium or signal carrier containing instructions for implementing the method of the present disclosure.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in computer program products in any tangible medium of expression having computer-available program code embodied thereon.

Any combination of one or more computer readable medium(s) may be utilized. A computer-available or computer readable storage medium may be, for example, but not limited to, an electronic, magnetic, optical, electromagnetic, infrared, or semiconductor system, apparatus, or device, or propagating medium. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, such as transmission medium supporting Internet or Intranet, or a magnetic storage device. It should be noted that the computer-available or computer readable medium may even be a paper or other suitable medium printed with a program thereon, because the program may be obtained electronically by electrically scanning such paper or other medium, and then compiled, interpreted or processed in a suitable manner, and if necessary, stored in a computer memory. In the context of the present document, a computer-available or computer-readable medium may be any medium containing, storing, communicating, propagating, or transmitting a program available for an instruction execution system, apparatus or device, or associated with the instruction execution system, apparatus, or device. A computer-available medium may comprise a data signal contained in a base band or propagated as a part of carrier and embodying a computer-available program code. A computer-available program code may be transmitted by any suitable medium, including, but not limited to, radio, wire, fiber cable, or RF, etc.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although the present disclosure is described in details in combination with the above preferred solution, it is appreciated that, the above embodiments are only intended to be illustrative and not limiting. Those skilled in the art may modify the solutions as illustrated in the present disclosure without departing from the scope and spirit of the present disclosure.

What is claimed is:

1. A computer-implemented method of processing an application, comprising:
   compiling, via one or more computer processors, a source file of the application to generate an object file corresponding to the source file;
   linking the object file that is generated from the compiling to determine whether there occurs a Table Of Content (TOC) access overflow within the object file, wherein the compiling comprises obtaining frequency information of a TOC symbol, wherein the frequency information is obtained from a static/dynamic profiling analysis by accumulating frequency of each access, and wherein the linking comprises:
      recording in an overflow symbol list overflow information of the overflow, wherein the overflow information comprises an overflow symbol of the TOC access overflow and an object filename of the object file containing the overflow symbol, and wherein the linking further comprises, in response to determining that there occurs a TOC access overflow within the object file, re-sorting TOC entries according to the frequency information of the TOC symbol;
      in response to occurrence of the TOC access overflow within the object file, re-compiling the source file corresponding to the object file within which the TOC access overflow occurs so as to generate an object file having no TOC access overflow wherein the re-compiling comprises:
         determining the object file within which the TOC access overflow occurs according to the overflow symbol list; and
      replacing, with the object file having no TOC access overflow as generated from the re-compiling, the object file within which the TOC access overflow occurs, and re-linking the object file.

2. The method according to claim 1, wherein the compiling further comprises:
   generating a single-instruction TOC access for the source file; and wherein the re-compiling further comprises:
      generating a multi-instruction TOC access for the source file corresponding to the object file within which the TOC access overflow occurs.

3. The method according to claim 2, wherein the multi-instruction TOC access is a dual-instruction TOC access in a form of two pieces of instructions.

4. The method according to claim 1, wherein the compiling further comprises:
   recording a compiling command of the compiling.

5. A system for processing an application, comprising:
   one or more computer processors;
   a compiler configured to execute on at least one of the one or more computer processors and, when executed, is further configured to compile a source file of the application to generate an object file corresponding to the source file;

a linker configured to execute on at least one of the one or more computer processors and, when executed, is further configured to link the object file that is generated from the compiling, wherein the compiler is further configured to obtain frequency information of a TOC symbol, wherein the frequency information is obtained from a static/dynamic profiling analysis by accumulating frequency of each access, and wherein:

the linker is further configured to determine whether there occurs a Table Of Content (TOC) access overflow within the object file, wherein the linker is further configured to record in an overflow symbol list overflow information of the overflow, wherein the overflow information comprises an overflow symbol of the TOC access overflow and an object filename of the object file containing the overflow symbol, and wherein the linker is further configured to, in response to determining that there occurs the TOC access overflow within the object file, re-sort TOC entries according to the frequency information of the TOC symbol;

the compiler is further configured to, in response to occurrence of the TOC access overflow within the object file, re-compile the source file corresponding to the object file within which the TOC access overflow occurs so as to generate an object file having no TOC access overflow, the compiler is further configured to determine the object file within which the TOC access overflow occurs according to the overflow symbol list; and the linker is further configured to replace, with the object file having no TOC access overflow as generated from the re-compiling, the object file within which the TOC access overflow occurs, and re-link the object file.

6. The system according to claim 5, wherein the compiler is further configured to generate a multi-instruction TOC access for the source file corresponding to the object file within which the TOC access overflow occurs.

7. The system according to claim 6, wherein the multi-instruction TOC access is a dual-instruction TOC access in a form of two pieces of instructions.

8. The system according to claim 5, wherein the compiler is further configured to record a compiling command of the compiling.

* * * * *